(12) United States Patent
Sandrisser et al.

(10) Patent No.: US 11,354,526 B1
(45) Date of Patent: Jun. 7, 2022

(54) SYSTEM AND METHOD FOR LOCATING AND DECODING UNREADABLE DATA MATRICES

(71) Applicant: General Motors LLC, Detroit, MI (US)

(72) Inventors: Thomas Sandrisser, Austin, TX (US); Kathryn R. McCready, Austin, TX (US); Filmon Belay, Cedar Park, TX (US); Ross Warkentin, Round Rock, TX (US)

(73) Assignee: General Motors LLC, Detroit, MI (US)

(*) Notice: Subject to any disclaimer, the term of this patent is extended or adjusted under 35 U.S.C. 154(b) by 0 days.

(21) Appl. No.: 17/194,621

(22) Filed: Mar. 8, 2021

(51) Int. Cl.
G06K 7/14 (2006.01)
G06N 3/04 (2006.01)
G06K 7/10 (2006.01)

(52) U.S. Cl.
CPC ......... G06K 7/1443 (2013.01); G06K 7/1417 (2013.01); G06K 7/1456 (2013.01); G06N 3/04 (2013.01); G06K 2007/10514 (2013.01)

(58) Field of Classification Search
CPC .. G06K 7/1443; G06K 7/1417; G06K 7/1456; G06K 2007/10514; G06N 3/04
See application file for complete search history.

(56) References Cited

PUBLICATIONS

Y. Ren and Z. Liu, "Barcode detection and decoding method based on deep learning," 2019 2nd International Conference on Information Systems and Computer Aided Education (ICISCAE), 2019, pp. 393-396, doi: 10.1109/ICISCAE48440.2019.217911. (Year: 2019).*
T. Grósz, P. Bodnar, L. Tóth and L. G. Nyúl, "QR code localization using deep neural networks," 2014 IEEE International Workshop on Machine Learning for Signal Processing (MLSP), 2014, pp. 1-6, doi: 10.1109/MLSP.2014.6958902. (Year: 2014).*

* cited by examiner

*Primary Examiner* — Matthew Mikels

(57) ABSTRACT

A decoding system for an optical identifier includes a feature detection module configured to locate an optical identifier on an item in a captured image. The optical identifier contains encoded data, the encoded data includes information about the item, the optical identifier includes a plurality of cells, and each of the plurality of cells has one of a first state and a second state. An enhancement module configured to generate an enhanced optical identifier by selectively mapping each of the plurality of cells to one of the first state and the second state based on states of neighboring ones of the plurality of cells. A decoder module is configured to decode the encoded data contained in the enhanced optical identifier to output the information about the item.

7 Claims, 4 Drawing Sheets

SYSTEM AND METHOD FOR LOCATING AND DECODING UNREADABLE DATA MATRICES

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to data matrices used to encode information.

Data matrices may be used to encode information for tracking components (e.g., vehicle parts) during vehicle manufacturing. For example, a data matrix may be encoded with information including, but not limited to, a serial number of a vehicle component, a manufacture date of the vehicle component, a manufacturing location of the vehicle component, etc. The data matrix may be read (e.g., scanned by a scanning device) at various stages of manufacture to identify and track the component.

SUMMARY

A decoding system for an optical identifier includes a feature detection module configured to locate an optical identifier on an item in a captured image. The optical identifier contains encoded data, the encoded data includes information about the item, the optical identifier includes a plurality of cells, and each of the plurality of cells has one of a first state and a second state. An enhancement module configured to generate an enhanced optical identifier by selectively mapping each of the plurality of cells to one of the first state and the second state based on states of neighboring ones of the plurality of cells. A decoder module is configured to decode the encoded data contained in the enhanced optical identifier to output the information about the item.

In other features, the feature detection module is configured to use a neural network to locate the optical identifier in the captured image.

In other features, the neural network is a mask regional convolutional neural network.

In other features, the neural network is configured to locate features of the optical identifier.

In other features, the enhancement module is configured to map each of the plurality of cells of the optical identifier to a grayscale value.

In other features, the first state corresponds to black and the second state corresponds to white, and the enhancement module is configured to map each of the plurality of cells as black or white based on grayscale values of the neighboring ones of the plurality of cells.

In other features, the optical identifier includes a predetermined pattern, the predetermined pattern includes a plurality of at least one of known black cells and known white cells, and the enhancement module is configured to map each of the plurality of cells as black or white based on grayscale values of the at least one of the known black cells and the known white cells of the predetermined pattern.

In other features, the pattern is at least one of a finder pattern and a timing pattern.

In other features, the finder pattern consists of black cells and the timing pattern includes alternating black and white cells.

In other features, the decoding system further includes an approximation module configured to compare the enhanced optical identifier to a plurality of known encoded data strings.

A decoding system includes a neural network module configured to locate a data matrix on an item in a captured image. The data matrix contains encoded data, the encoded data includes information about the item, the data matrix includes a plurality of cells, each of the plurality of cells has one of a first state and a second state, the data matrix includes a finder pattern, and the neural network is configured to located the data matrix by detecting the features of the data matrix in the captured image. An enhancement module is configured to generate an enhanced data matrix by selectively mapping each of the plurality of cells to one of the first state and the second state based on states of neighboring ones of the plurality of cells. An approximation module is configured to compare the enhanced data matrix to a plurality of known encoded data strings and fill in portions of the enhanced data matrix based on the comparison. A decoder module is configured to decode the encoded data contained in the enhanced data matrix to output the information about the item.

A method of decoding an optical identifier includes locating an optical identifier on an item in a captured image. The optical identifier contains encoded data, the encoded data includes information about the item, the optical identifier includes a plurality of cells, and each of the plurality of cells has one of a first state and a second state. The method further includes generating an enhanced optical identifier by selectively mapping each of the plurality of cells to one of the first state and the second state based on states of neighboring ones of the plurality of cells and decoding the encoded data contained in the enhanced optical identifier to output the information about the item.

In other features, the method further includes using a neural network to locate the optical identifier in the captured image.

In other features, the neural network is a mask regional convolutional neural network.

In other features, the method further includes using the neural network to locate features of the optical identifier.

In other features, the method further includes mapping each of the plurality of cells of the optical identifier to a grayscale value.

In other features, the first state corresponds to black and the second state corresponds to white, and further comprising mapping each of the plurality of cells as black or white based on grayscale values of the neighboring ones of the plurality of cells.

In other features, the optical identifier includes a predetermined pattern, wherein the predetermined pattern includes a plurality of at least one of known black cells and known white cells, and further comprising mapping each of the plurality of cells as black or white based on grayscale values of the at least one of the known black cells and the known white cells of the predetermined pattern.

In other features, the pattern is at least one of a finder pattern and a timing pattern, wherein the finder pattern consists of black cells, and wherein the timing pattern includes alternating black and white cells.

In other features, the method further includes comparing the enhanced optical identifier to a plurality of known encoded data strings.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Data matrices imprinted on items such as vehicle parts or components may be damaged during manufacturing steps performed on the component. For example, processes such as heat treatment, abrasive processes, machining, milling, rust protection application, etc. may damage data matrices. The damage may render the data matrices difficult to detect or completely unreadable.

Data matrix decoding systems and methods according to the present disclosure are configured to detect and decode unreadable (e.g., damaged, indistinct, incomplete, etc.) data matrices. For example, a data matrix decoding system implements a neural network configured to detect a data matrix (e.g., a location and/or rotational orientation of a data matrix) in a captured image. The data matrix decoding system then enhances the detected data matrix to correct missing or unclear fields. The enhanced data matrix may be compared to known data matrices to match the enhanced data matrix to one of the known data matrices.

While described with respect to data matrices used to track vehicle parts, the principles of the present disclosure are also applicable to non-vehicle implementations, and/or to other optical identifiers or two-dimensional codes.

Figure 1A:
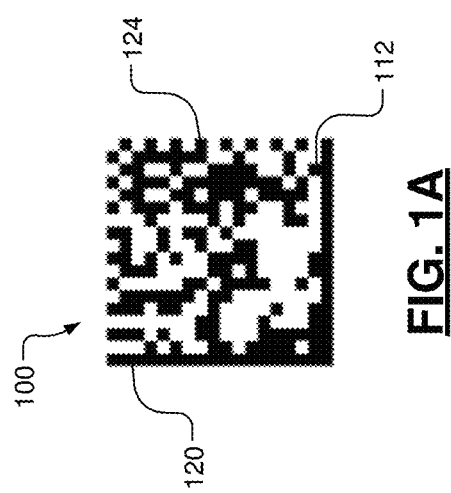
FIG. 1A is an example data matrix.
Figure 1C:
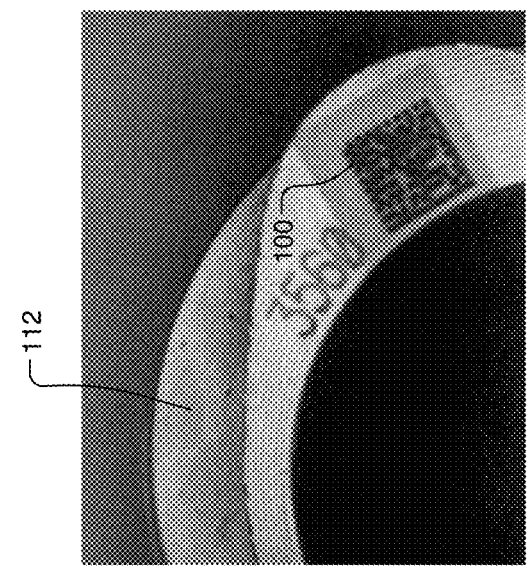
FIGS. 1B and 1C show images of an example data matrix imprinted on an item.
Figure 1B:
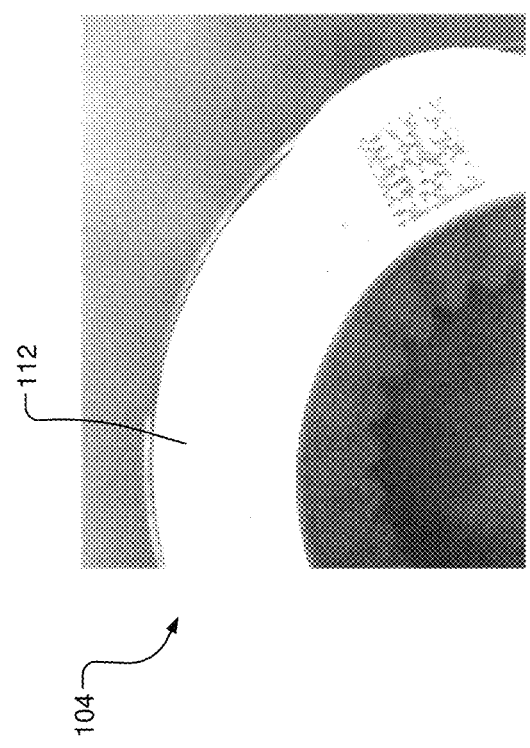

FIG. 1A shows an example optical identifier such as a data matrix 100 and FIGS. 1B and 1C are respective images 104 and 108 of the data matrix 100 imprinted on an item 112 (e.g., a vehicle component). The data matrix 100 includes a plurality of features or cells (e.g., dots) 116 arranged in a square or rectangular pattern (e.g., in linear rows and columns). The cells 116 correspond to binary bits that contain encoded information. For example, the each of the cells 116 individually represents a value of "1" (e.g., in a first state, corresponding to a black or dark cell) or "0" (e.g., a second state, corresponding to a white or light cell).

When decoded, the cells 116 in the data matrix 100 indicate information about the item 112. For example, the data matrix 100 may be encoded with information including, but not limited to, a serial number of the item 112, a manufacture date of the item 112, a manufacturing location of the item 112, etc. The data matrix 100 may be read (e.g., scanned by a scanning device) at various stages of manufacture to decode the data matrix 100 identify and track the item 112.

A border of the data matrix 100 may include an identifying feature or finder pattern 120. As shown, the finder pattern 120 is an "L"-shaped pattern occupying the cells 116 of a first (i.e., leftmost, in FIG. 1A) column and a last (i.e., bottom, in FIG. 1B) row. For example, each of the cells 116 in the finder pattern 120 are black (i.e., have a value of 1) to define the "L"-shape with a solid line. In other words, two adjacent sides of the border of the data matrix 100 are occupied by the finder pattern 120. The finder pattern 120 is used to locate the data matrix 100 and determine an orientation of the data matrix 100 on the item 112. For example, an image capture device such as a scanner may be configured to detect and identify the finder pattern 120 in an image.

Conversely, two other adjacent sides of the border of the data matrix 100 include a clocking or timing pattern 124. The cells 116 of the timing pattern 124 include alternating white and black cells. The timing pattern 124 is used to determine a size and spacing of the cells 116 in the data matrix 100, determine a quantity of the cells 116 (e.g., a quantity of rows and columns) in the data matrix 100, etc. For example, an image capture device such as a scanner may be configured to detect the timing pattern 124 in the image and calculate the quantity of rows and columns in the data matrix 100 accordingly.

As shown in the images 104 and 108 FIGS. 1B and 1C, portions of the data matrix 100 may be damaged during manufacturing steps and become faded, obscured, removed, etc. The damaged data matrix 100 may be undetectable and unreadable. For example, the finder pattern 120, the timing pattern 124, and/or one or more of the cells 116 may be damaged.

Figure 2:
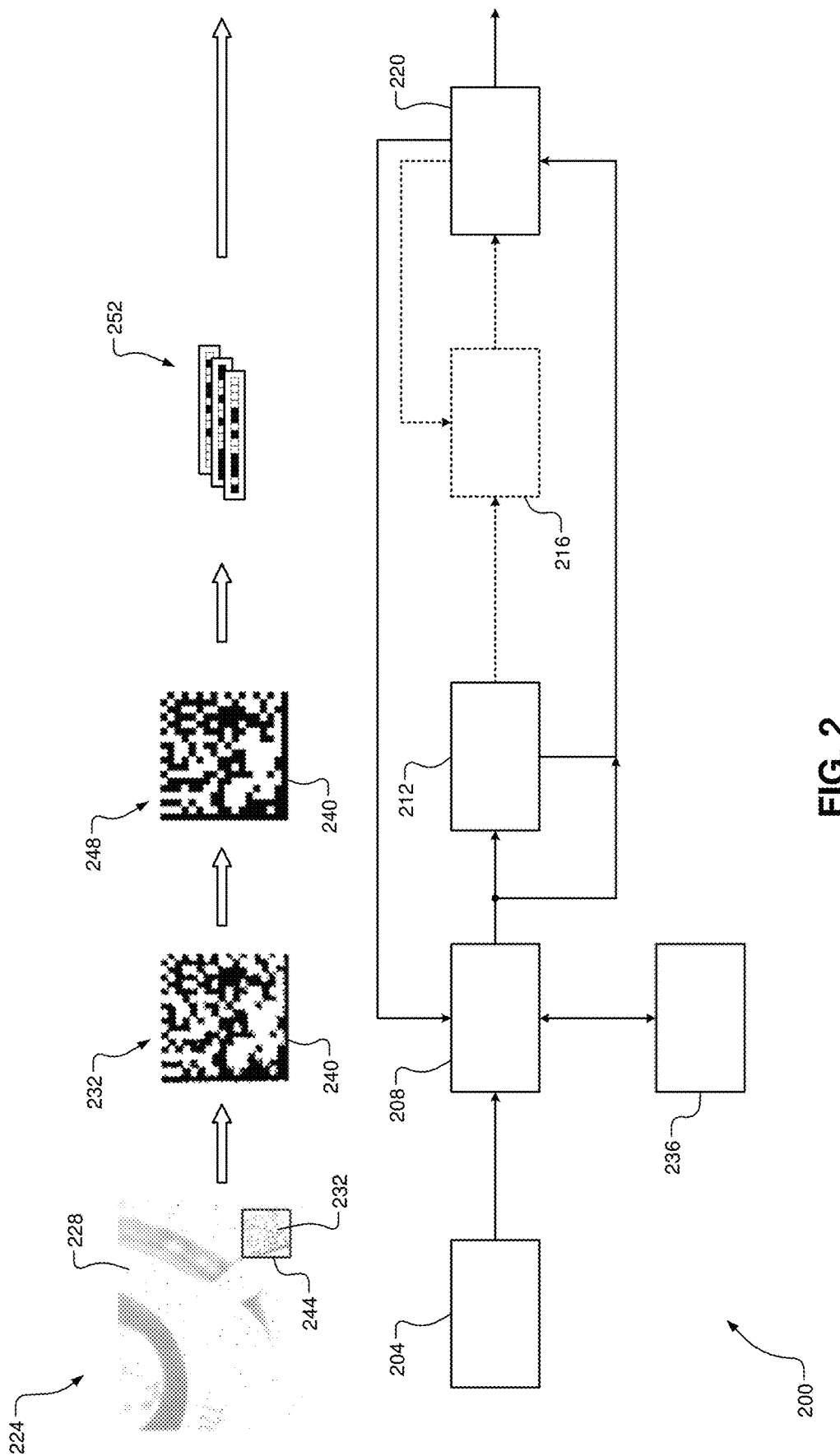
FIG. 2 is a functional block diagram of an example data matrix decoding system according to the present disclosure.

Referring now to FIG. 2, an example data matrix decoding system 200 according to the present disclosure is configured to detect, enhance, and decode a damaged data matrix. The data matrix decoding system 200 includes an image capture device 204, a feature detection module 208, an enhancement module 212, an approximation module 216, and a decoder module 220 as described below in more detail.

The image capture device 204 may include a camera, scanner, etc. configured to scan or capture an image. For example, the image capture device 204 is configured to capture an image 224 of an item (e.g., a vehicle component 228) 228 including a data matrix 232. The data matrix 232 may be damaged and rendered at least partially unreadable due to one or more manufacturing steps performed on the item 228. The image capture device 204 may correspond to a handheld scanner, a scanner arranged to scan items on an assembly line or other manufacturing assembly, etc.

The feature detection module 208 is configured to analyze the image 224 to identify features of the damaged data matrix 232 and locate the data matrix 232, extract the features, etc. For example, the feature detection module 208 is configured to locate a finder pattern 240 of the data matrix 232 in the image 224 to locate the data matrix 232, determine an orientation of the data matrix 232 in the image 224, etc.

In some examples, the feature detection module 208 includes and/or communicates with a neural network module 236 configured to detect and locate the data matrix 232. For example, the neural network module 236 implements a neural network, such as a convolutional neural network (CNN) or another suitable type of neural network. The neural network module 236 uses the neural network to locate and extract a feature such as a finder pattern 240 from the image 224 of the data matrix 232. For example, the neural network is a mask regional CNN (mask R-CNN) trained to identify the L-shaped finder pattern 240 of the data matrix 232.

The neural network module 236 generates and outputs information indicating the location of the data matrix 232 in the image 224. In one example, the neural network module 236 may be configured to detect features of the data matrix 232 and identify an entire region of the image 224 that includes the data matrix 232. In another example, the neural network module 236 may be configured to detect only a portion of the data matrix 232 and identify the region of the image 224 that includes the data matrix 232 accordingly. For example, the neural network module 236 may detect the finder pattern 240 and identify the region of the image 224 that includes the data matrix 232 based on the detected finder pattern 240.

The neural network module 236 generates a bounding box 244 around the data matrix 232 based on the identified region of the image 224. The bounding box 244 may be identified by information such as x-y coordinates of one corner of the bounding box 244 (which may or may not align with a corner of the data matrix 232) in the image 224, a height and width of the bounding box, etc. The neural network module 236 provides the information indicating the location of the data matrix 232 (location information) to the feature detection module 208.

The location information and the image with the detected data matrix 232 may be provided directly to the decoder module 220 for decoding. The decoder module 220 is configured to decode the data matrix 232. If the decoding is unsuccessful, the image 224 and the location information may also be provided to the enhancement module 212. The enhancement module 212 is configured to use the location information to enhance the data matrix 232 by correcting missing or unreadable fields within the region of the image 224 identified by the location information. The enhancement module 212 generates and outputs an enhanced data matrix 248. In other words, if the decoder module 220 is unable to decode the un-enhanced data matrix 232, the decoder module 220 instead decodes the enhanced data matrix 248 to determine and output the information about the item 228 encoded within the data matrix 232 imprinted on the item 228.

In some examples, the enhanced data matrix 248 may be provided to the approximation module 216 instead of or in addition to the decoder module 220. For example, the enhanced data matrix 248 may be provided directly to the approximation module 216 from the enhancement module 212. In other examples, the enhanced data matrix 248 may be provided to the approximation module 216 from the enhancement module 212 or the decoder module 220 if the decoder module 220 is not able to decode the enhanced data matrix 248. For example, one or more portions of the enhanced data matrix 248 may still be unreadable.

The approximation module 216 is configured to compare the enhanced data matrix 248 (e.g., portions of the enhanced data matrix 248 that are unreadable) to a set 252 of possible encoded known data strings (a known data set 252). For example, the known data set 252 may be include all possible encoded data strings for a corresponding portion of the enhanced data matrix 248. The data strings may correspond to a row, a pair of rows, etc., and/or may correspond to a given piece of information (e.g., a serial number, a date, etc.). In this manner, the approximation module 216 matches an incomplete portion of the enhanced data matrix 248 to one of the known data set 252 and may fill in fields of the enhanced data matrix 248 that are unreadable based on the match.

Figure 3A:
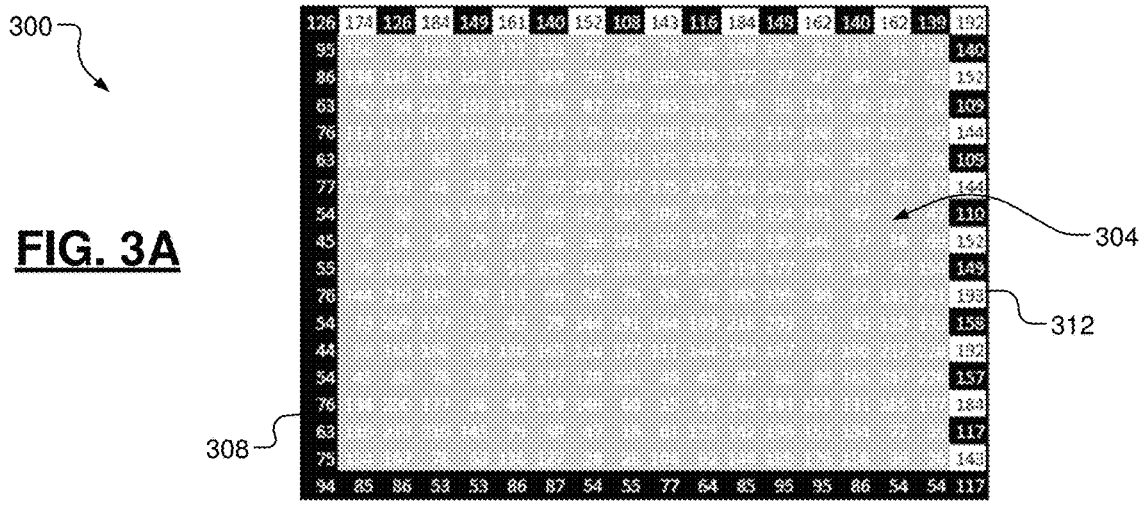
FIGS. 3A, 3B, and 3C illustrate an example enhancement process according to the present disclosure.
Figure 3B:
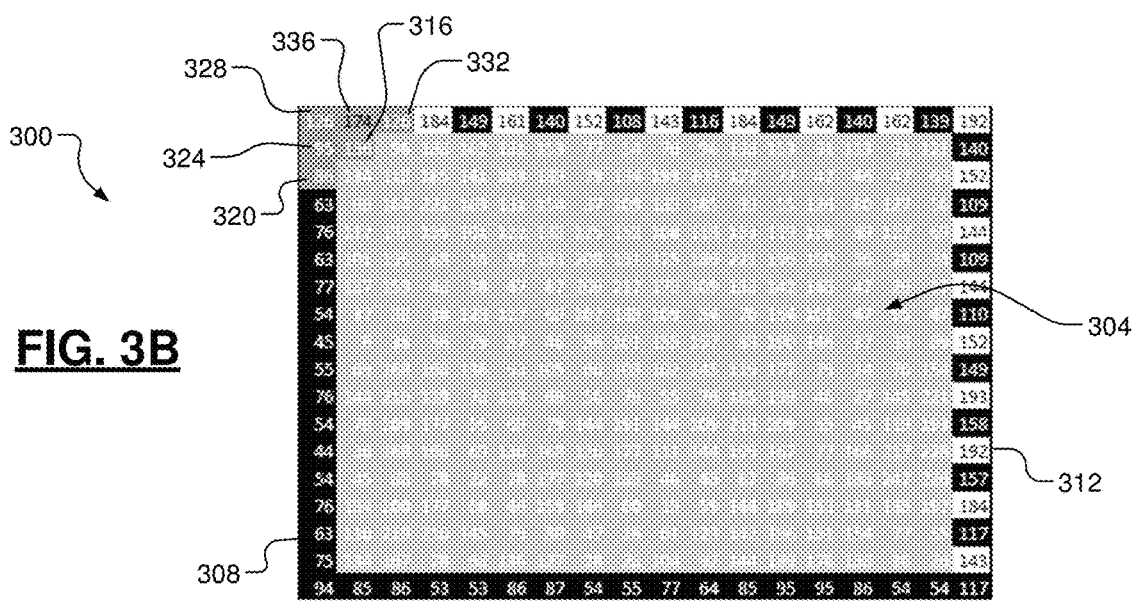
Figure 3C:
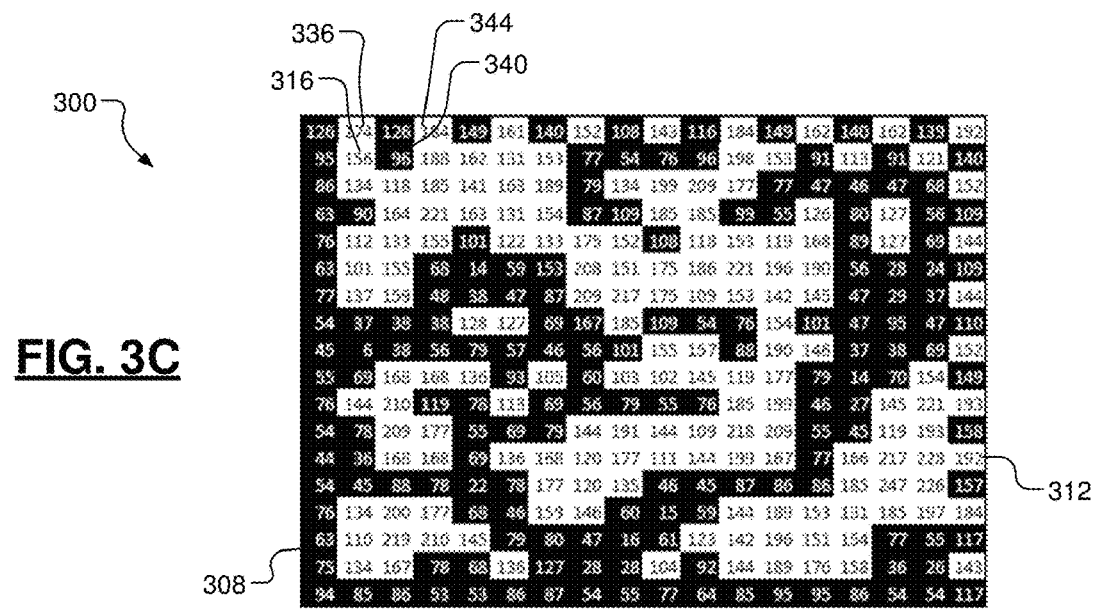

Referring now to FIGS. 3A, 3B, and 3C and with continued reference to FIG. 2, an enhancement process or algorithm performed by the enhancement module 212 is described in more detail. As shown in FIG. 3A, the enhancement module 212 maps each field or cell of a data matrix 300 to a respective numerical grayscale value (or another measure of pixel intensity). For example, grayscale values may range from 0 (black) to 255 (white). While states of individual cells in a data region 304 (i.e., a portion including encoded data) of the data matrix 300 are unknown, states of cells of a finder pattern (e.g., an L-shaped finder pattern 308) and a timing pattern 312 are known. For example, the finder pattern 308 may consist of only black cells while the timing pattern 312 includes alternating black and white cells. Accordingly, the grayscale values of the cells of the finder pattern 308 and the timing pattern 312 may be mapped to (i.e., tagged as) "black" or "white."

In this manner, although cells in a given region of the data matrix 300 may not be recognizably black or white, respective grayscale values of the cells may indicate whether the cells as originally imprinted in the data matrix 300 were black or white. The enhancement module 212 according to the present disclosure is configured to map each cell in the data region 304 as black or white based on grayscale values of neighboring cells (e.g., immediately adjacent cells, cells within x cells or pixels of the cell, etc.) and grayscale values of known black or white cells.

For example, the enhancement module 212 is configured to assess each cell individually in a predetermined sequence. As shown in FIG. 3B, the enhancement module 212 begins with a cell 316 (having a grayscale value 156) in an upper left corner of the data region 304. The cell 316 is adjacent to known black cells 320, 324, 328, and 332 (having respective grayscale values 86, 95, 126, and 126) and known white cell 336 (having a grayscale value 174). The enhancement module 212 maps the cell 316 to black or white based on the known black or white states of the cells 320, 324, 328, 332, and 336 and their respective grayscale values and the grayscale value of the cell 316.

In one example, the enhancement module 212 calculates an average of the grayscale values of the black cells 320, 324, 328, and 332 (i.e., an average of 86, 95, 126, and 126, or 108.25) and an average of the values of the white cell 336 (i.e., 174 since there is only one white cell neighboring the cell 316). The enhancement module 212 determines which of the averages (108.25 or 174) the grayscale value of the cell 316 (156) is nearer to. In this case, the grayscale value of the cell 316 is nearer to the average grayscale value of the neighboring white cells. Accordingly, the enhancement module 212 maps the cell 316 as a white cell as shown in FIG. 3C.

In other words, each cell is not simply mapped as black or white based on a predetermined threshold (e.g., a midpoint between 0 and 255, such as 128). Rather, each cell is mapped to black or white based on grayscale values of neighboring cells, which may vary for black and white in different regions of the data matrix 300. For example, some regions of the data matrix 300 may be especially faded, darkened, or otherwise damaged. Accordingly, criteria for mapping each cell to black or white are dynamic for each region.

Upon being mapped, the cell 316 may then be considered as a known black cell for subsequent analyses of neighboring cells. For example, the enhancement module 212 may then map a cell 340. While mapping the cell 340, the grayscale value of the cell 316 is averaged with other known white cells 336 and 344 to determine whether to map the cell 340 to black or white.

The enhancement module 212 continues to map each of the cells of the data region 304 in this manner. In one example, the enhancement module 212 first maps each of the cells around a perimeter of the data region 304 (i.e., each of the cells in a top row, a bottom row, a leftmost column, and a rightmost column). In other words, the enhancement module 212 first maps the cells that are directly adjacent to the known black or white cells of the finder pattern 308 and the timing pattern 312. The enhancement module 212 then proceeds to the interior cells of the data region 304 until all of the cells in the data matrix 300 are mapped as either black or white. The data matrix 300 can then be decoded (e.g., by the decoder module 220), provided to the approximation module 216, etc.

Figure 4:
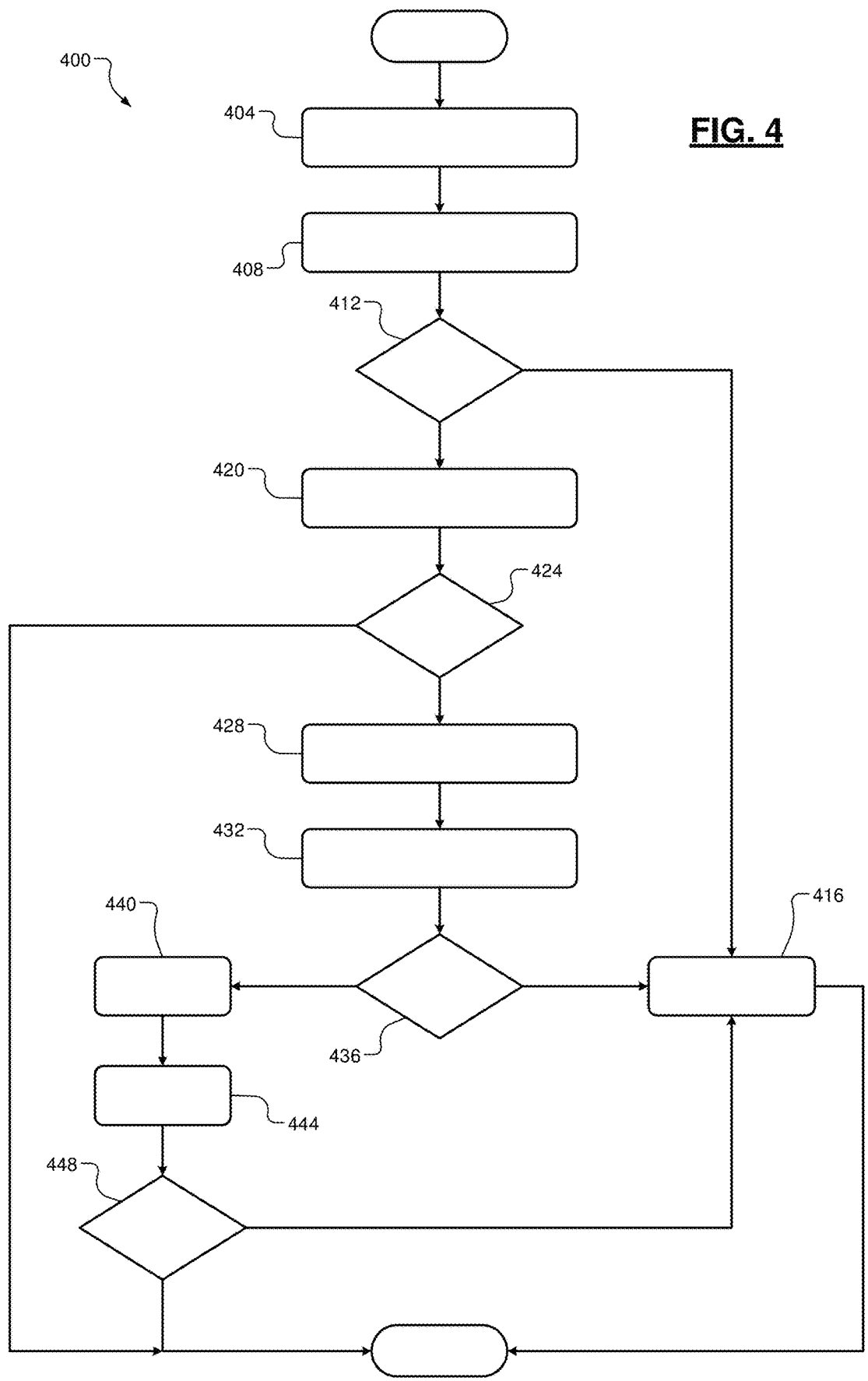
FIG. 4 illustrates steps of an example method of decoding a data matrix according to the present disclosure.

Referring now to FIG. 4, an example method 400 of decoding a data matrix according to the present disclosure is shown. For example, the method 400 is performed by the data matrix decoding system 200 of FIG. 2. At 404, the method 400 scans or captures an image of a data matrix (e.g., a data matrix imprinted on an item). At 404, the method 400 attempts to decode the data matrix. In other words, the method 400 may attempt to simply detect and decode the data matrix with the decoder module 220 without further correction or enhancement. At 412, the method 400 determines whether the data matrix was successfully decoded. If true, the method 400 (e.g., the decoder module 220) outputs decoding results (i.e., decoded data that was encoded into the data matrix) at 416. If false, the method 400 continues to 420.

At 420, the method 400 (e.g., the feature detection module 208) analyzes the captured image to identify and locate the data matrix. For example, the method 400 identifies and locates the data matrix using a neural network as described above in FIG. 2. At 424, the method 400 determines whether the data matrix was successfully located. If true, the method 400 continues to 428. If false, the method 400 ends. For example, if the method 400 is unable to locate the data matrix, the data matrix for the corresponding item may be flagged as unreadable and unrecoverable.

At 428, the method 400 enhances the data matrix. For example, the method 400 (e.g., the enhancement module 212) enhances the data matrix to map each cell as black or white as described above in FIGS. 3A, 3B, and 3C. At 432, the method 400 attempts to decode the enhanced data matrix. At 436, the method 400 determines whether the data matrix was successfully decoded. If true, the method 400 outputs decoding results at 416. If false, the method 400 continues to 440.

At 440, the method 400 (e.g., the approximation module 216) compares the enhanced data matrix to a set of possible encoded known data strings to fill in unreadable portions of the enhanced data matrix as described above in FIG. 2. At 444, the method 400 again attempts to decode the enhanced data matrix. At 448, the method 400 determines whether the data matrix was successfully decoded. If true, the method 400 outputs decoding results at 416. If false, the method 400 ends. For example, if the method 400 is unable to match the unreadable portions of the enhanced data matrix to any known data strings, the data matrix for the corresponding item may be flagged as unreadable and unrecoverable.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A decoding system for an optical identifier, the decoding system comprising:
    a feature detection module configured to locate an optical identifier on an item in a captured image, wherein the optical identifier contains encoded data, wherein the encoded data includes information about the item, wherein the optical identifier includes a plurality of cells, and wherein each of the plurality of cells has one of a first state and a second state;
    an enhancement module configured to generate an enhanced optical identifier by selectively mapping each of the plurality of cells to one of the first state and the second state based on states of neighboring ones of the plurality of cells; and
    a decoder module configured to decode the encoded data contained in the enhanced optical identifier to output the information about the item,
    wherein the enhancement module is configured to map each of the plurality of cells of the optical identifier to a grayscale value,
    wherein the first state corresponds to black and the second state corresponds to white, and wherein the enhancement module is configured to map each of the plurality of cells as black or white based on grayscale values of the neighboring ones of the plurality of cells, and
    wherein the optical identifier includes a predetermined pattern, wherein the predetermined pattern includes a plurality of at least one of known black cells and known white cells, and wherein the enhancement module is configured to map each of the plurality of cells as black or white based on grayscale values of the at least one of the known black cells and the known white cells of the predetermined pattern.

2. The decoding system of claim 1, wherein the feature detection module is configured to use a neural network to locate the optical identifier in the captured image.

3. The decoding system of claim 2, wherein the neural network is a mask regional convolutional neural network.

4. The decoding system of claim 2, wherein the neural network is configured to locate features of the optical identifier.

5. The decoding system of claim 1, wherein the pattern is at least one of a finder pattern and a timing pattern.

6. The decoding system of claim 5, wherein the finder pattern consists of black cells and the timing pattern includes alternating black and white cells.

7. The decoding system of claim 1, further comprising an approximation module configured to compare the enhanced optical identifier to a plurality of known encoded data strings.

* * * * *